(12) United States Patent
Fang

(10) Patent No.: US 12,493,072 B2
(45) Date of Patent: Dec. 9, 2025

(54) SYSTEM AND METHOD FOR IDENTIFYING DESIGN FAULTS OR SEMICONDUCTOR MODELING ERRORS BY ANALYZING FAILED TRANSIENT SIMULATION OF AN INTEGRATED CIRCUIT

(71) Applicant: Bayes Electronics Technology Co., Ltd, Zhejiang (CN)

(72) Inventor: Gang Peter Fang, Zhejiang (CN)

(73) Assignee: Bayes Electronics Technology Co., Ltd, Shaoxing (CN)

( * ) Notice: Subject to any disclaimer, the term of this patent is extended or adjusted under 35 U.S.C. 154(b) by 987 days.

(21) Appl. No.: 17/120,618

(22) Filed: Dec. 14, 2020

(65) Prior Publication Data

US 2021/0181250 A1 Jun. 17, 2021

Related U.S. Application Data

(60) Provisional application No. 62/948,875, filed on Dec. 17, 2019.

(51) Int. Cl.
*G01R 31/28* (2006.01)
*G01R 27/28* (2006.01)
*G01R 31/317* (2006.01)

(52) U.S. Cl.
CPC ......... *G01R 31/2848* (2013.01); *G01R 27/28* (2013.01); *G01R 31/2812* (2013.01); *G01R 31/31705* (2013.01)

(58) Field of Classification Search
CPC ............... G01R 31/2848; G01R 27/28; G01R 31/2812; G01R 31/31705; G06F 30/367
See application file for complete search history.

(56) References Cited

U.S. PATENT DOCUMENTS

| 5,335,191 A | 8/1994 | Kundert et al. |
| 8,200,461 B2 | 6/2012 | Fang |

(Continued)

FOREIGN PATENT DOCUMENTS

| CN | 101853322 A | * 10/2010 | |
| CN | 105205191 A | * 12/2015 | ......... G06F 17/5009 |

OTHER PUBLICATIONS

International Search Report and Written Opinion of the International Searching Authority from PCT/CN2020/136679; Guo, Minghua; dated Mar. 16, 2021 (related application); 10 pages.

(Continued)

*Primary Examiner* — Bijan Mapar

(57) ABSTRACT

A method for detecting non-convergence error in a transient circuit simulation wherein a circuit netlist and control statements associated with a circuit for the transient circuit simulation are received. A transient circuit simulation is performed responsive to a time point. Whether a non-convergence error has occurred during transient circuit simulation is determined. A transient debug mode is actuated responsive to determination of occurrence of the non-convergence error. The steps of performing the transient circuit simulation and determining whether a non-convergence error has occurred are repeated after actuation of the transient debug mode. Results of the transient circuit simulation are provided responsive to a determination of non-occurrence of a non-convergence error.

20 Claims, 12 Drawing Sheets

(56) References Cited

U.S. PATENT DOCUMENTS

| | | | |
|---|---|---|---|
| 8,554,530 B1 * | 10/2013 | O'Riordan | G06F 30/33 716/106 |
| 2002/0013932 A1 | 1/2002 | Liu et al. | |
| 2002/0016705 A1 * | 2/2002 | Kroell | G06F 30/33 703/14 |
| 2003/0005416 A1 | 1/2003 | Henftling et al. | |
| 2009/0326882 A1 | 12/2009 | Fang | |
| 2011/0071812 A1 | 3/2011 | Fang | |
| 2013/0214784 A1 | 8/2013 | Dietz et al. | |
| 2014/0244223 A1 | 8/2014 | Fang | |

OTHER PUBLICATIONS

Kundert: "Chapter 2, DC Analysis", Excerpted from "The Designer's Guide to SPICE and Spectre"; pp. 15-22.

Intusoft, Solving SPICE Convergence Problems, 1996, Intusoft, pp. 355-372.

Mayukh Bhattacharya and Pinaki Mazumder: "Augmentation of SPICE for Simulation of Circuits Containing Resonant Tunneling Diodes"; IEEE Transactions on Computer-Aided Design of Integrated Circuits and Systems, vol. 20, No. 1, Jan. 2001, pp. 39-50.

* cited by examiner

SYSTEM AND METHOD FOR IDENTIFYING DESIGN FAULTS OR SEMICONDUCTOR MODELING ERRORS BY ANALYZING FAILED TRANSIENT SIMULATION OF AN INTEGRATED CIRCUIT

CROSS-REFERENCE TO RELATED APPLICATIONS

This application claims benefit of U.S. Provisional Application No. 62/948,875, filed Dec. 17, 2019, entitled SYSTEM AND METHOD FOR IDENTIFYING DESIGN FAULTS OR SEMICONDUCTOR MODELING ERRORS BY ANALYZING FAILED TRANSIENT SIMULATION OF AN INTEGRATED CIRCUIT, which is incorporated by reference herein in its entirety.

TECHNICAL FIELD

The present invention relates to circuit analysis using transient circuit simulation, and more particularly, to the identification of design faults and modeling errors that cause non-convergence errors in transient circuit simulations.

BACKGROUND

Debugging a transient non-convergence failure is probably one of the most difficult tasks a circuit designer or an EDA engineer faces. The designer/engineer needs to run a number of additional test simulations, dig through millions of lines in log files, and go back-forth with simulator vendors for clues as to the cause of the non-convergence failure. The process takes days or weeks, sometimes months, yet often fails to lead any deterministic conclusion. However, the non-convergence is a serious problem as it indicates possible faults in the design or semiconductor components are not modeled properly by the SPICE models in the PDK. The designer often ends up with redesigning the circuit without knowing what exactly causes the non-convergence. A solution for detecting these non-convergence failures would be greatly beneficial to circuit designers.

SUMMARY

The present invention, as disclose and described herein, in one aspect thereof comprises a method for detecting non-convergence error in a transient circuit simulation wherein a circuit netlist and control statements associated with a circuit for the transient circuit simulation are received. A transient circuit simulation is performed responsive to a time point. Whether a non-convergence error has occurred during transient circuit simulation is determined. A transient debug mode is actuated responsive to determination of occurrence of the non-convergence error. The steps of performing the transient circuit simulation and determining whether a non-convergence error has occurred are repeated after actuation of the transient debug mode. Results of the transient circuit simulation are provided responsive to a determination of non-occurrence of a non-convergence error.

BRIEF DESCRIPTION OF THE DRAWINGS

For a more complete understanding, reference is now made to the following description taken in conjunction with the accompanying Drawings in which.

DETAILED DESCRIPTION

Figure 1:
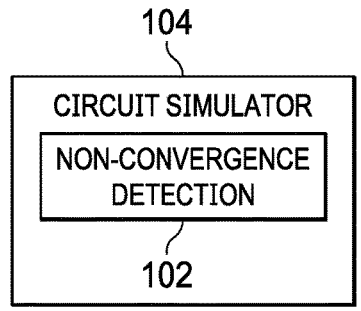
FIG. 1 illustrates a block diagram of a system for detection of convergence errors within a circuit simulator.

Referring now to the drawings, wherein like reference numbers are used herein to designate like elements throughout, the various views and embodiments of a system and method for identifying design faults or semiconductor modeling errors by analyzing failed transient simulation of an integrated circuit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Circuit Simulator

As shown generally in FIG. 1, the present disclosure relates to a method or a system 102 that automatically analyzes the failed transient simulation and reports the exact cause of the non-convergence, a design fault or a bad SPICE model. The method/system 102 can be included/implemented in any modern circuit simulator 104 with little effort. One example of a circuit simulator is illustrated below with respect to FIGS. 2-4B.

Figure 2:
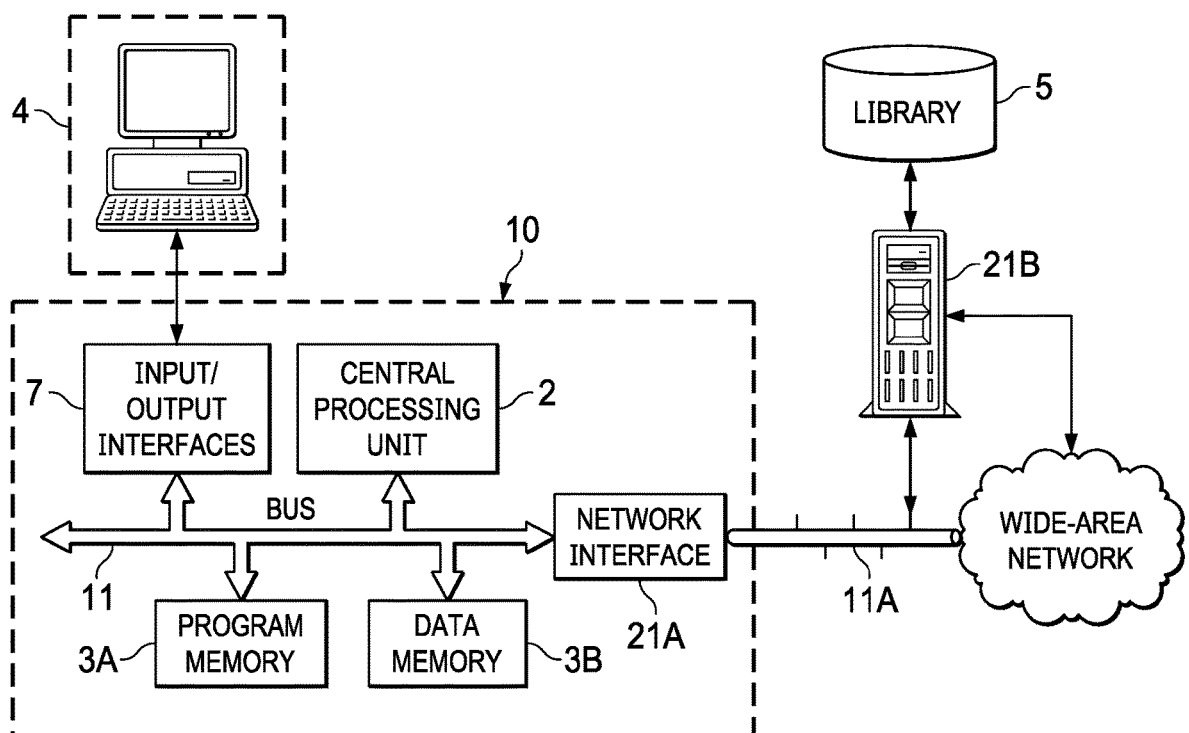
FIG. 2 illustrates a block diagram of a circuit modeling and simulation system.

FIG. 2 is a simplified block diagram illustrating an exemplary computer simulation system 1 which can be used both to generate and utilize modified (or enhanced or replaced) device models to simulate electronic circuits and systems. System 1 includes a workstation 10 including a CPU (central processing unit) 2 which is operatively coupled by means of a bus 11, a network interface 21A, another bus 11A, and a server 21B to one or more computer-readable mass storage devices in a model library 5. Model library 5 may include disk drives and CD-ROM drives and the like, and stores both "base parametric models" and modified, replaced, or enhanced parametric models of circuit devices. Workstation 10 also includes a program memory 3A, a data memory 3B, and an input/output interface 7 each coupled to bus 11. Input/output interface 7 is coupled via a bus 8 to a peripheral function unit 4 which may include a keyboard, a digital pointer device such as a mouse, trackball, light pen, touch screen input device or the like, and a display device such as an LCD screen.

In FIG. 2, workstation 10 executes software instructions that are stored in one of its memory resources to represent an integrated circuit which is to be simulated. As is known for SPICE and similar simulation systems, the simulation of an electronic circuit is based on a set of circuit elements that are associated with selected "nodes" in an overall "netlist" that specifies the circuit which is to be simulated. Each circuit element is specified by a model which specifies the simulated behavior of that circuit element in response to input stimuli applied to the circuit element. Initial conditions to be applied at nodes of the modeled circuit for the purpose of simulating the transient response of that circuit may be input by the user via peripheral devices 4 or may be initial state data stored in model library 5. (For example, the time interval over which the transient response is to be analyzed is input via peripheral devices in block 4 or by retrieving a previously stored interval.) Conventional transient analysis is performed by time discretization over the selected time interval, wherein a system of equations descriptive of the modeled circuit is then solved in a piece-wise fashion at each of a sequence of discrete time points. The discrete transient time points within that interval are generally chosen by a time-stepping method (e.g., based on local truncation errors, break points, and the like).

As previously indicated, circuit components or devices used in conventional SPICE circuit modeling are described by mathematical models which generally are a collection of mathematical representations, such as input/output transfer functions, of various device parameters that characterize the devices/components. Such mathematical representations are referred to herein as "parametric models". A particular circuit component/element may be represented by various base parametric device models. Data to be associated with a "base parametric device model" typically is collected or "extracted" by measurement of corresponding physical devices and is utilized in generating the device model, for example by "curve-fitting" of actual device data to equations utilized in the base parametric models. During a simulation run, if a base parametric device model operates outside of the range of the extracted physical device data utilized to generate that base parametric device model, it is considered to be "out-of-range" and therefore no longer valid. When that occurs, the base parametric device model equation is dynamically modified, i.e., enhanced or replaced, by a simpler equation that allows the simulator computations to converge.

There are many causes for the base parametric model of a semiconductor device in a circuit to be "out-of-range" during the simulation. At some point during the simulation, a base parametric device model may receive or generate very large representations of currents or voltages (or of parameters) that cause it to be "out-of-range" and therefore inaccurate. For example, sometimes designers run "top-level simulations" with very loose parameter tolerances, and this may cause the base parametric device model to experience large, out-of-range voltage swings or "overshoots". In some cases, improper device models might be used for "less important" devices in the circuit being simulated. In some cases, "out-of-range" operation of a base parametric device model may be the result of a design error. In any case, whenever a base parametric device model is undergoing out-of-range of operation, it no longer can be considered to accurately describe the behavior of the corresponding actual physical device in the circuit being simulated.

Figure 3A:
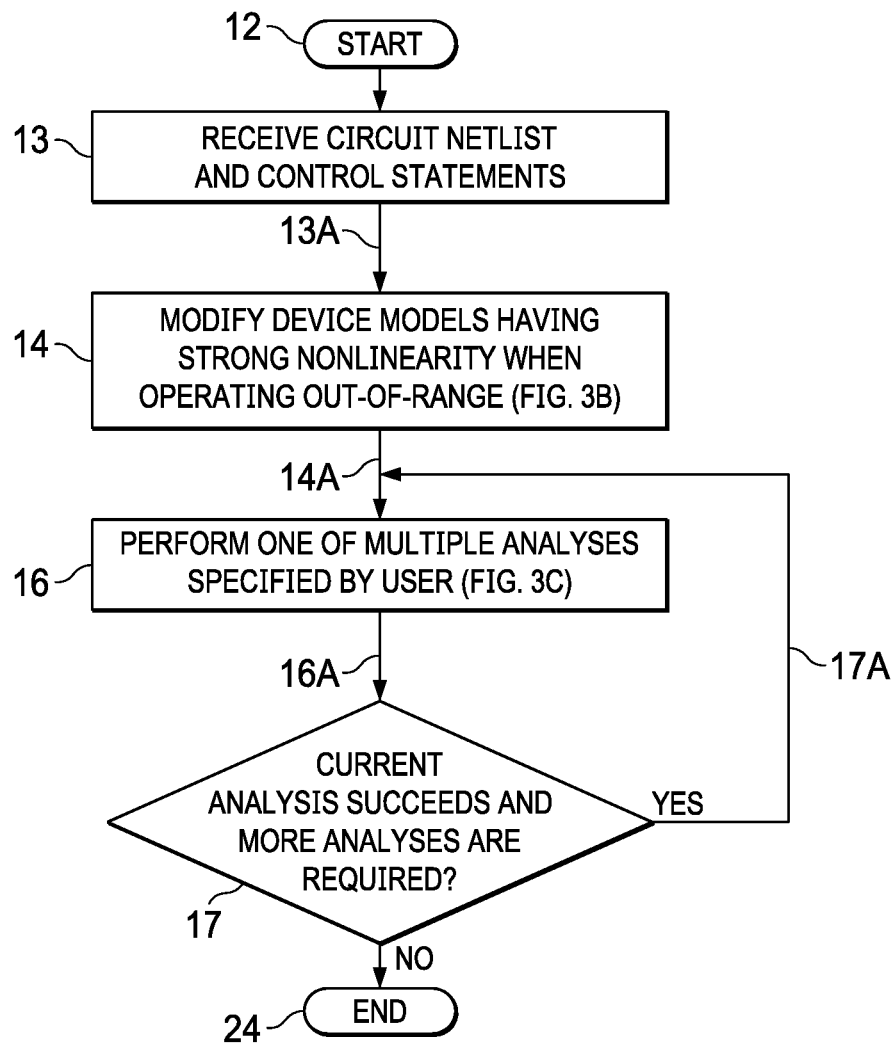
FIGS. 3A-E illustrates a flowchart of a program for simulating circuits with out-of-range parameters and/or variables occurring in a device model.

FIG. 3A shows a top-level flowchart wherein a START label 12 indicates the beginning of the overall process of simulating DC or transient operation of a particular circuit to be simulated (the structure of which has been entered by the user into simulation system 1). For example, the simulation program executed by simulation system 1 (FIG. 2) may receive a circuit netlist that includes a description of the appropriate circuit component model connections, and also may receive a "control statement", as indicated in block 13. The control statement typically includes various device parameter tolerances, and also typically includes the desired number of circuit analyses and indicates whether they are AC analyses or DC analyses.

Referring to block 14, the simulation process modifies or enhances or replaces a base parametric device model as needed to provide a suitable simplified device model that allows simulation computations to converge whenever simulation system 1 finds that the base parametric device model is operating out-of-range. The simulation program evaluates all of the base parametric device models that are strongly nonlinear whenever they are operating out-of-range, so that the out-of-range device models can be modified or replaced by a linear or less nonlinear models for out-of-range of operation. Specifically, simulation system 1 dynamically modifies base parametric device models that exhibit strong nonlinearity beyond their normal operating range. Highly nonlinear device functions, such as exponential functions, are replaced by simpler functions such as first order linear or second order polynomial functions with more simulator-friendly numerical properties. Simulation system 1 then performs one or multiple DC and/or transient analyses as specified by the user. For example, during each specified analysis simulation system 1 repeatedly evaluates/computes instances of nonlinear device conditions (i.e., evaluates/computes current through a diode, forward voltage across the diode, and/or conductance of the diode) in the circuit being simulated. If a nonlinear device goes into an out-of-range condition at some point during the simulation, then simulation system 1 switches from the original nonlinear base parametric model to a specified linear function or second order function and uses it for as long as the modified device model remains in the out-of-range condition, and then returns to the original nonlinear base parametric model. (An "out-of-range condition" of a device model is defined such that the device model's terminal parameters and/or variables fall outside of the actual physical device values that have been utilized in the base parametric device model.) Details of steps performed in accordance with block 14 are described with reference to subsequently described FIG. 3B. (Various other operations performed by simulation system 1 are well known.)

Referring to block 16, the modified or enhanced or replaced device model (hereinafter referred to simply as "modified device model") then is utilized to perform one or multiple DC and/or transient analyses using the modified/replaced device model. Specifically, the presently selected user-specified analysis is performed in accordance with the transient analysis process of subsequently described FIG. 3C. While an analysis is being performed, if a device model needs to be evaluated for an AC analysis, it is necessary to compute a DC operating point. That requires evaluating the nonlinear device models. To perform an AC analysis, it is necessary to linearize the associated device models at the DC operating point. (The operating point analysis can be (but does not need to be) a stand-alone analysis.) As indicated by decision block 17 in FIG. 3A, the simulation program next determines if the present analysis performed in accordance with block 16 is successful and if any further analyses are required. If the determination of decision block 17 is affirmative, the simulation program returns via flowchart path 17A to block 16 and performs the next user-specified analysis. If the determination of decision block 17 is negative, the overall simulation of the circuit under consideration is complete, as indicated by "END" label 24.

Figure 3B:
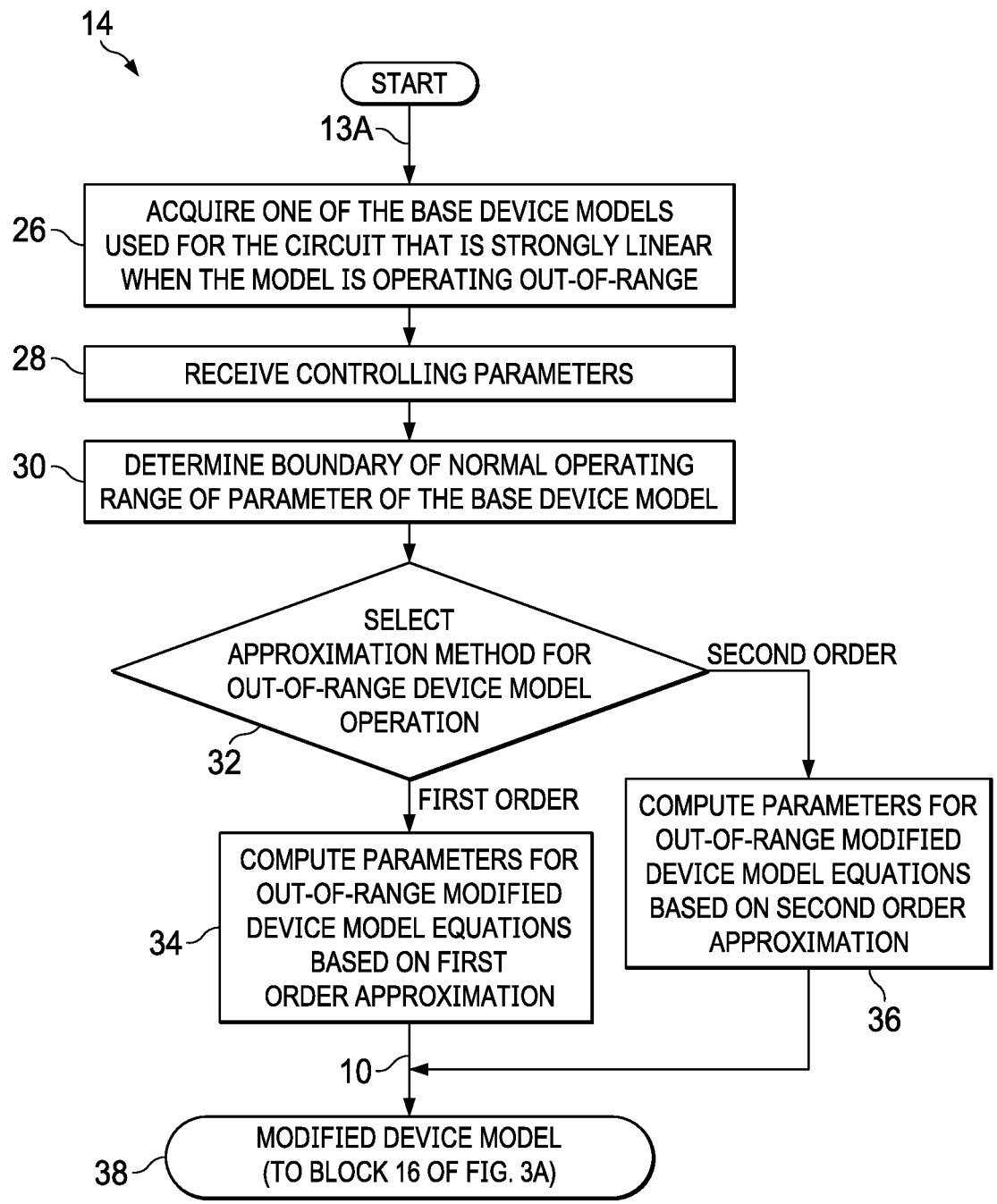

Details of the process of evaluating a device model as indicated in block 14 of FIG. 3A are shown in FIG. 3B, wherein the device evaluation program goes via path 13A from the start label to block 26 and acquires one of the device models from device library 5 (for example, a device model represented by subsequently described Equations (1) and (2)) used for the circuit being simulated from model library 5; that device model may show strong nonlinearity when operating out-of range. The program then goes to block 28 and receives specified controlling parameters. A controlling parameter can be at the circuit level or at the device level. For example, one circuit-level controlling parameter could be the maximum conductance for all the devices in the circuit. Another controlling parameter could be the maximum current for certain diode model.

The program then goes to block 30 and determines a boundary of the normal operating range for the device model under consideration, for example by using subsequently described Equation (3). Next, the program goes to decision block 32 and determines, on the basis of a user specified option, whether the present nonlinear base parametric device model should be modified or enhanced or replaced by a first order linear polynomial or a second order polynomial. If the determination of decision block 32 is that a first order polynomial should be used, the program goes to block 34 and computes appropriate parameters for out-of-range device mathematical functions, while maintaining continuity of the device functions and their first order derivatives. This results in a desired modified or enhanced or replaced device model, as indicated by path 10 and label 38. If the determination of decision block 32 is that a second order polynomial should be used, the program goes to block 36 and computes appropriate parameters for the out-of-range device. This results in the modified device model, as indicated by path 10 and label 38. The modified device model then is used in accordance with the process of block 16 in FIG. 3A.

Figure 4B:
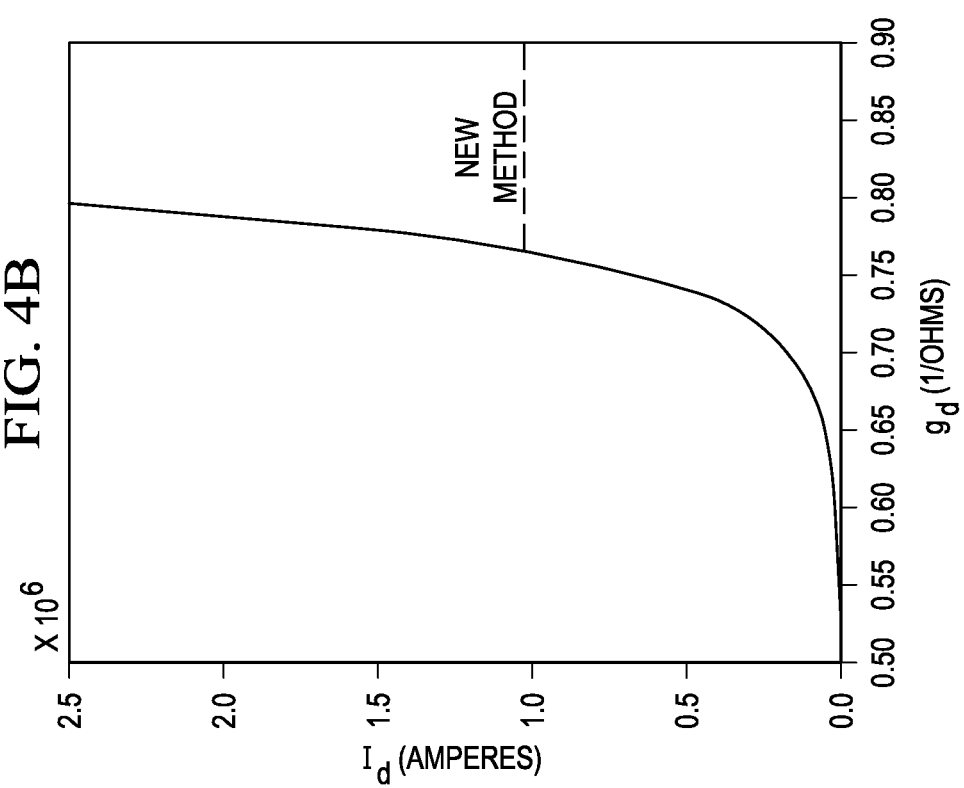
FIG. 4B illustrates a graph of the conductance of the simulated diode represented by FIG. 4A as a function of its voltage.
Figure 4A:
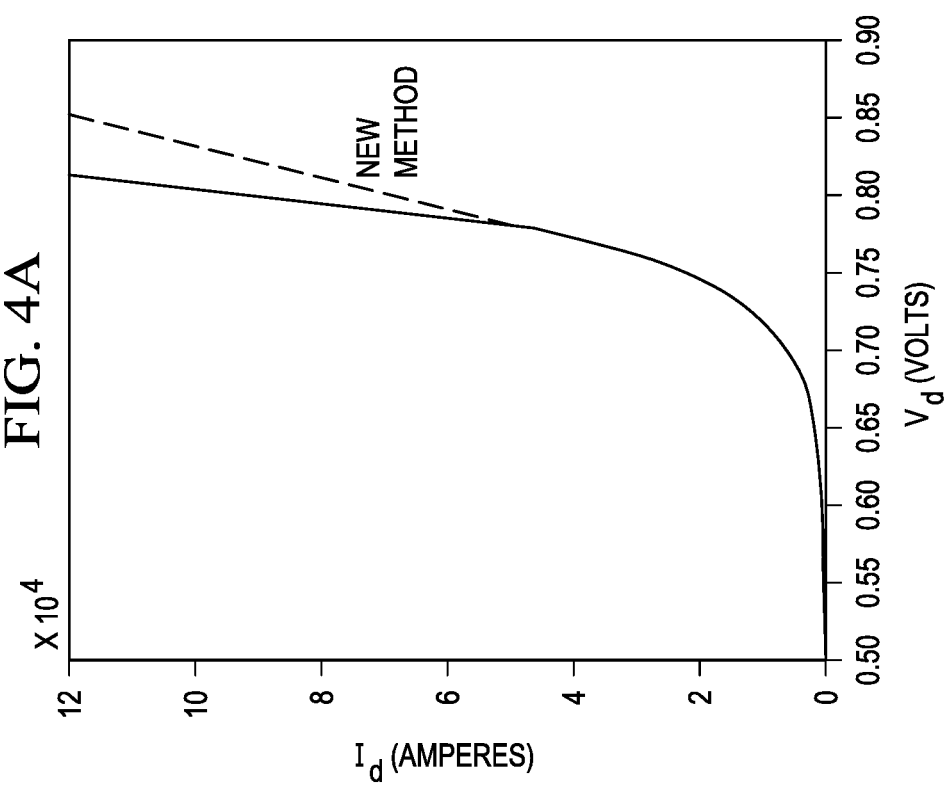
FIG. 4A illustrates a graph of the current through a simulated diode as a function of its voltage.

In one example, a diode model represented by Equations (1) and (2) below illustrates an original base parametric device model. Referring to block 26, simulation/analysis system 1 acquires this diode model from model library 5 (FIG. 2), with its current-voltage characteristics determined by Equation (1) and its conductance characteristics determined by Equation (2):

$$I_d = I_s\left(e^{\frac{v_d}{V_{te}}} - 1\right), \text{ and} \tag{1}$$

$$g_d = \frac{\partial I_d}{\partial v_d} = \frac{I_s}{V_{te}} e^{\frac{v_d}{V_{te}}} \tag{2}$$

where $v_d$ is the forward voltage across the diode, $I_d$ is the diode current, $g_d$ is the diode conductance, and $I_s$ and $V_{te}$ are model parameters. $I_s$ is the saturation current. $V_{te}=K*q/T$, K is Boltzman's constant, q is electronic charge, and T is temperature in degrees Kelvin. (FIG. 4A shows a representative graph of diode current $I_d$ according to Equation (1), and FIG. 4B shows a graph of the corresponding diode conductance $g_d$. The solid-line curves in FIGS. 4A and 4B represent Equations (1) and (2), respectively. The dashed line sections of the curves represent sections of the curves which have been dynamically modified in accordance with the present invention. Although both $I_d$ and its derivative are continuous, they are strongly nonlinear for large values of $v_d$. For example, in FIG. 4A it may be seen that at approximately $v_d$=0.75 V (volts) the exponential diode model may be considered to be out-of-range, and from that point on the equation of a suitable "easy-to-converge" linear or polynomial function may be substituted in place of the original exponential function.)

Referring to block 28 in FIG. 3B for this example, note that simulation/analysis system 1 receives controlling parameters for modifying the diode model, including values for voltage, current, and conductance (e.g., Vmax=0.7 V, Imax=1 A (ampere), gmax=(1×10$^{+3}$) mhos, as well as the choice (e.g., first-order or second order polynomial equation) of a substitute for the exponential expression in Equation (1).

Referring to block 30 in FIG. 3B, simulation/analysis system 1 in this example determines a boundary voltage $V_0$ of a "normal" operating range of forward voltage $v_d$ for Equation (1) of the diode model, given by $$V_0 = \min\left(V_{max}, V_{te}\ln\left(\frac{I_{max}}{I_s}\right), V_{te} = \ln\left(\frac{g_{max}V_{te}}{I_s}\right)\right), \tag{3}$$

where $V_0$ is the smallest or minimum among the three voltages indicated within the brackets.

If operation beyond the boundary voltage $V_0$ is detected, simulation/analysis system 1 then computes corresponding modified device model parameters for the selected linear or second order out-of-range current equations for the diode model. If linear approximation is chosen in accordance with decision block 34, simulation/analysis system 1 uses Equations 4, 5, 6 and 7 (below) to compute the following parameters based on the continuity conditions of the diode current and diode conductance, as indicated in block 34:

$$a_0 = I_s\left(e^{\frac{v_d}{V_{te}}} - 1\right), \tag{4}$$

$$a_1 = \frac{I_s}{V_{te}} e^{\frac{V_0}{V_{te}}}, \tag{5}$$

$$I_d = a_0 + a_1(v_d - V_0), \text{ and} \tag{6}$$

$$g_d = a_1. \tag{7}$$

However, if simulation/analysis system 1 determines in decision block 32 that second-order polynomial approximation is to be used to model $I_d$ for out-of-range operation of the diode, then simulation/analysis system 1 computes the following model parameters as indicated in block 36 based on the continuity conditions of current, conductance, and second order derivative of the current equation, $$a_0 = I_s\left(e^{\frac{V_0}{V_{te}}} - 1\right), \tag{4}$$

$$a_1 = \frac{I_s}{V_{te}} e^{\frac{V_0}{V_{te}}}, \tag{5}$$

-continued $$a_2 = \frac{I_s}{2V_{te}^2 e^{\frac{V_0}{V_{te}}}}, \qquad (8)$$

$$I_d = a_0 + a_1(v_d - V_0) + a_2(v_d - V_0)^2, \text{ and} \qquad (9)$$

$$g_d = a_1 + 2a_2(v_d - V_0). \qquad (10)$$

Note that if the base model is continuous, then the continuity of the current and its derivative of the modified device model remains continuous.

Figure 3C:
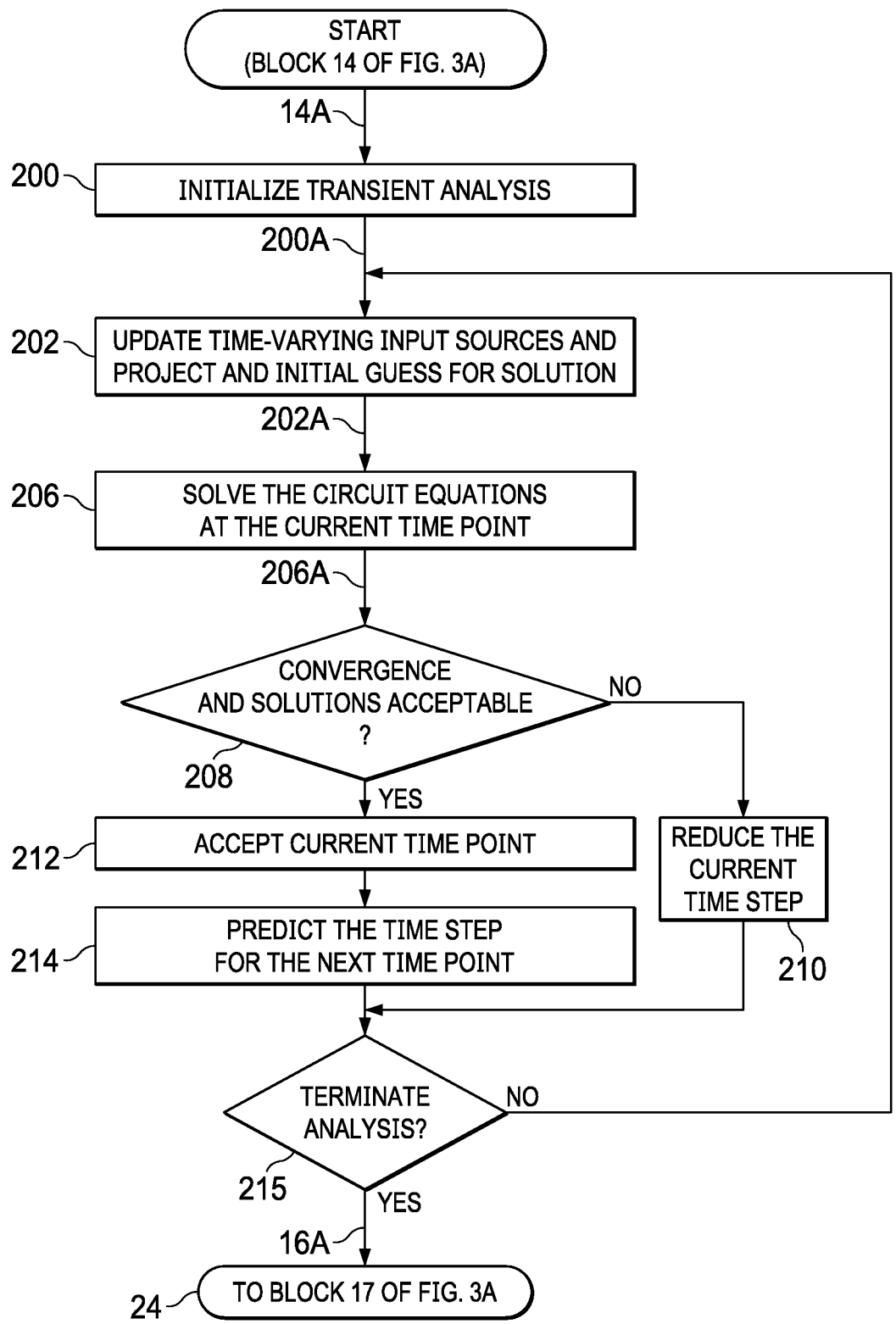

FIG. 3C is identical to FIG. 2A of U.S. patent application entitled "Method and System for Processing of Threshold-Crossing Events" filed Jun. 26, 2009, published Dec. 31, 2009 as Publication No. 2009/0326882, and incorporated herein by reference. FIG. 3C is a flow diagram of a method for transient analysis of a circuit model in circuit simulation system 1 in FIG. 2. The transient analysis is performed over a time interval (0,T) that is computationally divided into discrete time points $t_m$, where the time index m is the number of time points generated during the analysis. The start time and stop time for the time interval may be specified by the user. Modified nodal analysis of the modeled circuit is used to construct differential algebraic equations, and the time derivative terms of the differential algebraic equations are discretized to generate a system of nonlinear algebraic equations. The initialization may include predicting an initial time step $h_1$ for time index m=1 and generating a solution $v_0$ of the circuit equations for the first time point $t_0$ of the analysis for time index m=0. For ease of description, the assumption is made that the analysis begins at $t_0$=0 (or any other user-specified time point).

In FIG. 3C, the START label goes via path 14A from block 14 in FIG. 3A to block 200. In block 200, the simulation program first performs an initialization for the transient analysis in the present example. For example, a starting point (at which set the initial time might be set to zero) may be determined for a transient analysis that is to be performed. After the transient analysis is initialized, time points are generated (i.e., the nonlinear algebraic equations are solved) for each time index m and the transient analysis is terminated when the stop time T is reached. A time-varying input source provides an input stimulus signal, e.g., a voltage or current, having a value that is a function of time, so that the value of the input source may need to be adjusted when the current time point changes. To generate a solution at a time point $t_m$, the time-varying input sources are updated to generate the input stimulus values, and an initial guess for the solution $v_m$ of the nonlinear algebraic equations at time point $t_m$ is "projected", based on these updates and the solution(s) at previous time point(s). Note that at this point in the method, the time point $t_m$ is at a time step $h_m$ which is predicted either during the initialization process of block 200 or after acceptance of the previous time point $t_{m-1}$ either as indicated in block 212 or as modified in block 210 if the solution to the nonlinear algebraic equations for the predicted time step fails to converge or is not acceptable.

Then, as indicated in block 202, the next time point for the varying input stimulus is updated and an initial "guess" at a reasonable value of the simulated solution for the next time step is determined. The initial guess for the solution $v_m$ may be determined by any suitable means, e.g., by extrapolation. As indicated in block 206, the circuit equations are solved at each time point. (Once the initial guess for the solution $v_m$ is determined, the nonlinear algebraic equations are solved at the current time point $t_m$ using a Newton-Raphson iterative method that is described below in more detail with reference to FIG. 3D. In general, the Newton-Raphson iterative method takes the initial guess for the solution and refines it iteratively making the guess more and more accurate in each iteration.)

If the iterative method converges on a solution $v_m$ and the solution $v_m$ satisfies any user-specified requirements according to block 208, the solution $v_m$ for the time point $t_m$ is accepted in accordance with block 212. The acceptance of a time point in accordance with block 212 includes outputting any information, i.e., results, a user has requested for a time point. The outputting may involve, for example, storing the requested results and/or providing the results to another software application and/or displaying the results in human readable form (e.g., on paper or on a display). Any data structures used for generating time points are updated based on the current time point.

The time step is then predicted for the next time point in accordance with block 214. The next time point and the solution at the next time point are then generated based on the new time step in accordance with blocks 202-214 unless some criterion for terminating the analysis (such as the stop time for transient analysis has been reached in accordance with decision block 215) has been met.

If the iterative method does not converge on the solution $v_m$, or the solution $v_m$ does not satisfy any user-specified requirements according to block 208, the current time step his reduced, i.e., the current time point $t_m$ is moved closer to the previous time point. Another attempt is then made to generate the current time point $t_m$ unless some criterion for terminating the analysis has been met, such as the current time $h_m$ step being too small. If the simulated solution converges and is acceptable, as indicated by a "YES" determination by decision block 208, the current time point is accepted, as indicated in block 212. That predicts or determines the time step for the next time point, as indicated in block 214. If the determination of decision block 208 is "NO", the program goes to block 210 and reduces the current time step. The program then goes to decision block 215, and if that determination is negative the program returns to updating the time varying input source(s) and determining another initial guess for the solution, as indicated in block 202. An affirmative decision by decision block 215 results in the program following path 16A to decision block 17 in FIG. 3A. (More details for blocks 200-206 are set forth in subsequently described FIG. 3D.) In some situations non-convergence errors will arise that prevent convergence of the interative method. A solution to this problem will become further described below.

Figure 3D:
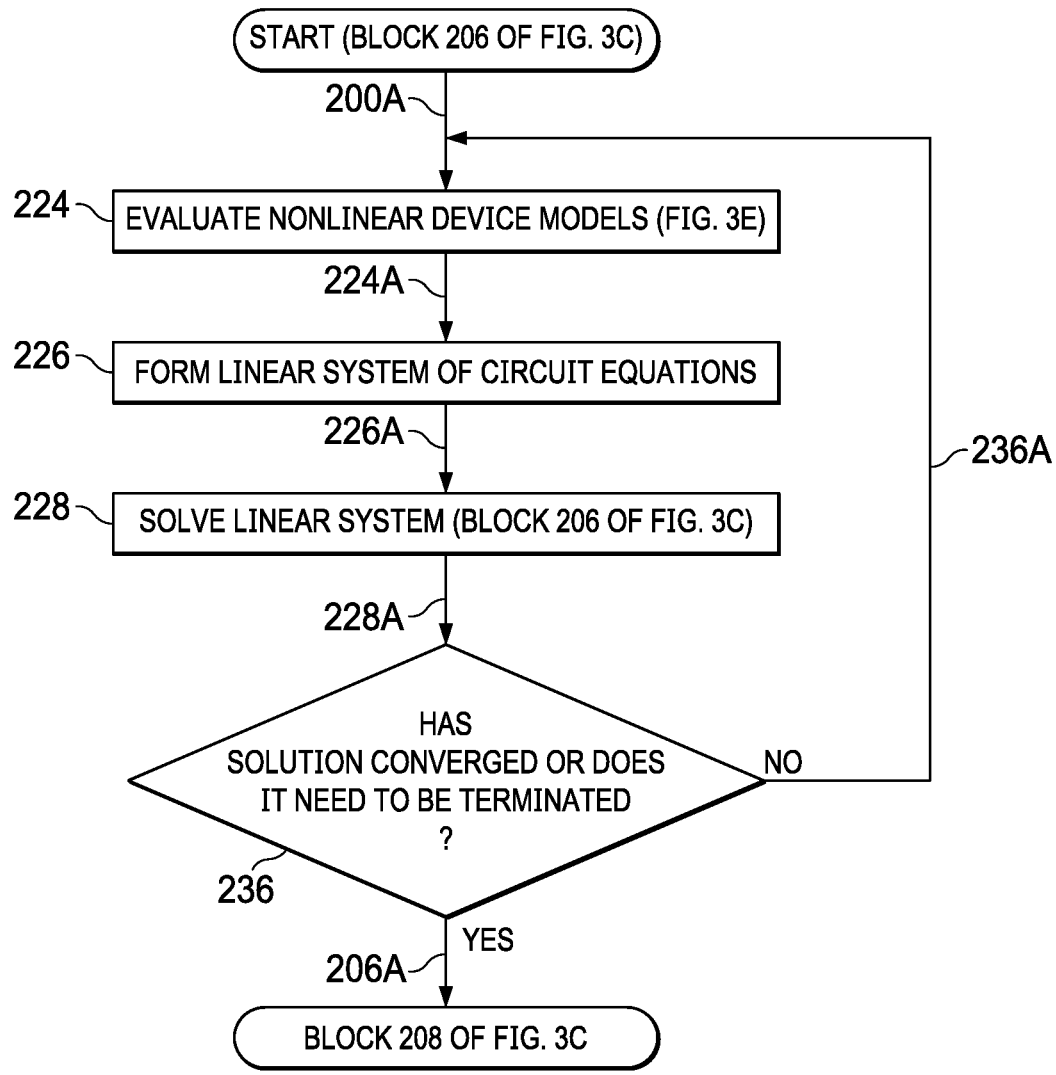

FIG. 3D is a simplified version of FIG. 2B of the above-mentioned (and incorporated herein by reference) Publication No. 2009/0326882. FIG. 3D illustrates a simplified Newton-Raphson numerical analysis process flow, and shows a flowchart of a method for solving the system of nonlinear algebraic circuit equations at the current time point tm. The method is an iterative method based on the Newton-Raphson approach for solving nonlinear algebraic equations. In essence, the method attempts to converge on the solution $v_m$ at the time point tm. As previously explained (with reference to block 202 of FIG. 3C), the method begins with the projected initial guess for the solution $v_m$ at the current time point $t_m$ and iterates until there is convergence to a solution as determined in accordance with decision block 236.

In FIG. 3D, the START label comes from block 206 of FIG. 3C and evaluates all of the nonlinear models as described below with reference to FIG. 3E. After the nonlinear devices are evaluated, the linear system of equations is formed (typically represented in a matrix) that represent the integrated circuit being simulated, as indicated in block 226. More specifically, the nonlinear algebraic equations are linearized around the current solution $v_m^k$. (Any suitable technique for forming the linear system of equations may be used.) The linear system of equations is then solved, as indicated in block 228 of FIG. 3D, to determine an update $\Delta v_m^{k+1}$ for the current solution $v_m^k$. The solution $v_m^{k+1}$ for the next iteration k+1 is then computed as the sum of the current solution $v_m^k$ and the update $\Delta v_m^{k+1}$. Then, in accordance with block 226, simulation system 1 forms a linear system. Then, in accordance with block 228, simulation system 1 solves the system of linearized equations.

The solution $\Delta v_m^{k+1}$ and other convergence criteria (e.g., Kirchoff's current law) are checked for convergence in accordance with decision block 236. If the decision of block 236 is affirmative, the solution has converged, and the program of FIG. 3D terminates and returns to block 208 of FIG. 3C. If the determination of decision block 236 is negative because solution has not converged, another iteration through blocks 224-228 is performed.

Figure 3E:
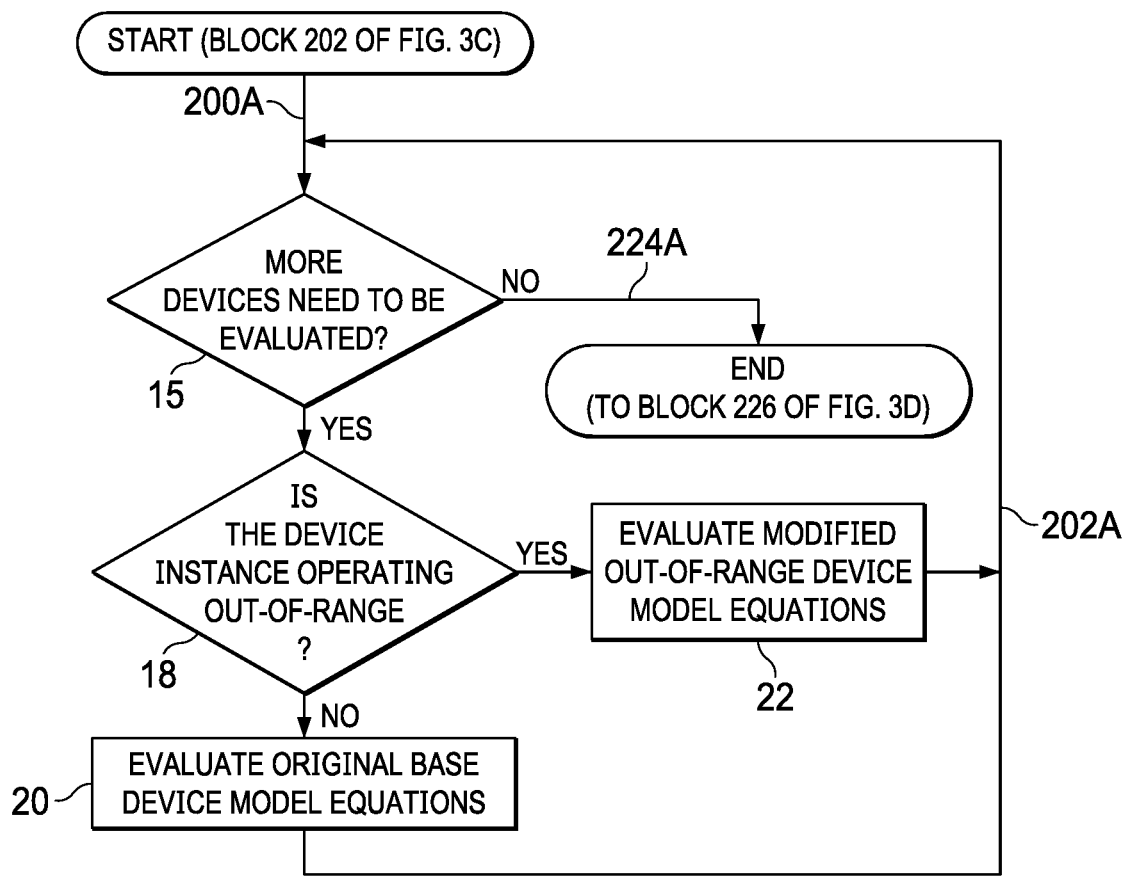

The flowchart of FIG. 3E illustrates the device evaluation process of block 224 of FIG. 3D. The START label in FIG. 3E therefore is the same starting point as in FIG. 3D, i.e., is the entry point of block 206 in FIG. 3D. The simulation program determines, in accordance with decision block 15, whether any more device models need to be evaluated. If that determination is affirmative, the program goes to decision block 18 and determines whether both the present device instance (i.e., device model) is operating out-of-range and a corresponding suitable modified device model is available. If the determination of decision block 18 is affirmative, then the simulation program goes to block 22 and evaluates (i.e., calculates) the modified out-of-range device model equations. If the determination of decision block 18 is negative, the simulation program goes to block 20 and evaluates the original base device model equations. In either case, the simulation program returns to decision block 15. If the determination of decision block 15 is negative, then the program returns to block 226 of FIG. 3D.

Thus, simulation system 1 (FIG. 2) automatically finds and identifies out-of-range conditions of the base parametric models of devices in the circuit being simulated and, if necessary, replaces or enhances or modifies highly nonlinear (and hence inaccurate) device functions (e.g., exponential functions) of the original base parametric models with linear and/or second order polynomial functions so as to preserve continuity and monotonicity of the original base parametric model. This technique greatly improves numerical stability of simulation system 1 and avoids convergence failures, and reduces simulator runtimes, thereby improving the robustness and the performance of the SPICE (or other) circuit simulation system 1.

This is in contrast to prior solutions such as changing simulator settings and/or modifying the circuit being simulated, which in effect are manual trial and error processes and are inherently highly inefficient, time-consuming, and costly. For example, the described technique of determining whether a device model is in an out-of-range condition does not require determining if the mathematical function in the model and/or its derivative are continuous, and does not try to "fix" such discontinuities as required by the prior art (as in the above mentioned published Liu et al. patent application). Instead, the described embodiment of the invention automatically replaces or modifies the original base parametric model by a simple first or second order polynomial function or the like so as to make the model less nonlinear. However, the described embodiment of the invention does not "fix" discontinuities of a device model.

The basics of circuit simulation are described herein below. Most circuit simulators use modified nodal analysis (based on Kirchhoff's laws) to formulate a system of N differential algebraic equations (DAEs), $$\bar{f}(\bar{v}(t)) = \frac{d}{dt}\bar{q}(\bar{v}(t)) + \bar{i}(\bar{v}(t)) + \bar{u}(t) = 0, \quad (11)$$

where $\bar{u} \in R^N$ is the vector of input sources, $\bar{v} \in R^N$ is the vector of solution variables, and $\bar{i}, \bar{q} \in R^{N \times 1}$ are the vectors of resistive currents and node charges/branch fluxes.

Figure 5:
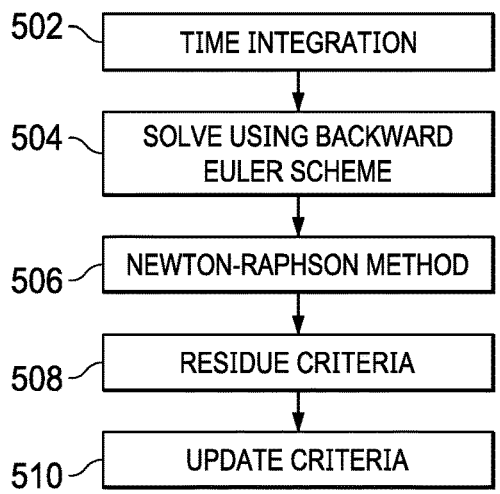
FIG. 5 illustrates a flow diagram describing the equations for determining convergence errors in a circuit simulation.

Referring now to FIG. 5, the time derivative term in the differential equation (11) can be discretized using a time integration scheme at 502. Without loss of generality, equation (11) is solved at 504 using a backward Euler scheme for simplicity. The resulting system of nonlinear equations is $$\bar{f}(\bar{v}_m) = \frac{\bar{q}(\bar{v}_m) - \bar{q}(\bar{v}_{m-1})}{h_m} + \bar{i}(\bar{v}_m) + \bar{u}_m = 0, \quad (12)$$

where m is time point index and $h_m$ is the time step size.

The Newton-Raphson method is used at 506 to obtain the solution for the system of nonlinear equations (12), which iteratively solve the following linear system until convergence criteria are satisfied, $$\bar{J}(\bar{v}_m^k)(\bar{v}_m^{k+1} - \bar{v}_m^k) = -\bar{f}(\bar{v}_m^k), \quad (13)$$

where k is the Newton iteration index and the Jacobian matrix $\bar{J}$ is given by, $$\bar{\bar{J}}(\bar{v}_m^k) = \frac{d}{d\bar{v}}\bar{f}(\bar{v}_m^k) = \bar{\bar{G}}(\bar{v}_m^k) + \frac{\bar{\bar{C}}(\bar{v}_m^k)}{h_m}, \quad (14)$$

here $\bar{\bar{G}} = d\bar{i}/d\bar{v}$ is the conductance matrix, $\bar{\bar{C}} = d\bar{q}/d\bar{v}$ is the capacitance matrix, and $\bar{\bar{G}}, \bar{\bar{C}} \in R^{N \times N}$.

There are two convergence criteria for the Newton-Raphson method. The first criterion or residue criterion specifies at 508 that KCL should be satisfied to certain degree, $$|f_n(\bar{v}_m^k)| < \epsilon_f, \quad (15)$$

where n is the equation index, and $\epsilon_f$ is the tolerance (a small positive number) for the criterion. The second criterion or update criterion specifies at 510 the difference between the last two iterations has to be small enough, $$|v_{m,n}^{k+1} - v_{m,n}^k| < \epsilon_v, \quad (16)$$

where $\epsilon_v$ is the tolerance for the update criterion.

Bad SPICE Model

Figure 6:
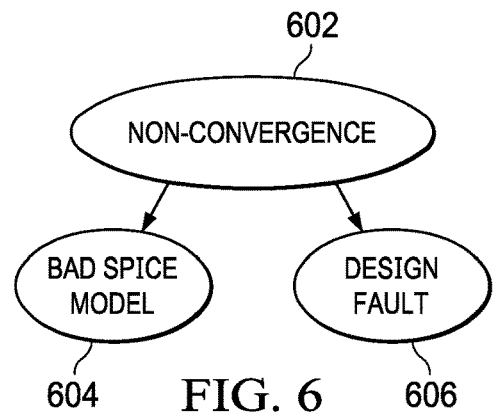
FIG. 6 illustrates various potential causes for non-convergence in a circuit simulation.

As mentioned above, non-convergence errors can arise where the solutions do not converge. As shown in FIG. 6, there are various potential causes for non-convergence 602. These include a bad SPICE model 604 and a design fault 606. With respect to the occurrence of a bad SPICE model 604, the Newton-Raphson method will converge under two conditions. These conditions include 1) the initial guess of the solution, $\bar{v}_m^0$, is close enough to the actual solution; and 2) the $2^{nd}$ order derivatives of the nonlinear circuit equations (12), $d^2\bar{f}(\bar{v})/\bar{v}^2$, exist.

During transient simulation, the first condition can be satisfied in most of cases as the time step size can always be reduced to make sure the change of signals is small enough. However, in some cases, device model equations have negative slope (negative conductance or capacitance) in certain region, which leads to non-convergence if the initial guess cannot avoid the negative slope region.

Most modern simulators do not form the nonlinear circuit equation (12) explicitly. Rather, SPICE model equations for semiconductor components are used to form the Jacobian matrix and right-hand-side of the linear system (13). The second condition is equivalent to the conductance and the capacitance of those models has to be derivable. If the conductance or capacitance does not have derivatives in some region, or worse, are not continuous, Newton iteration may not converge.

In both the situations the model needs to be fixed by the model provider. Since the Newton-Raphson method approximates the nonlinear function using linear expression as shown in equation (13), the following linearity check formulas is proposed to detect both the bad model cases, $$|i_j(\bar{v}^{k+1}) - (i_j(\bar{v}^k) + \bar{g}_j^T(\bar{v}^k) \cdot (\bar{v}^{k+1} - \bar{v}^k))| < \epsilon_i, \quad (17)$$

$$|q_j(\bar{v}^{k+1}) - (q_j(\bar{v}^k) + \bar{c}_j^T(\bar{v}^k) \cdot (\bar{v}^{k+1} - \bar{v}^k))| < \epsilon_q, \quad (18)$$

where j is the model terminal index, $i_j$, $q_j \in R^1$ are terminal current and terminal charge, $\bar{g}_j$, $\bar{c}_j \in R^{N \times 1}$ are vectors of device instance conductance and capacitance corresponding to terminal j, and $\epsilon_i$, $\epsilon_q$ are small positive numbers that service as thresholds for reporting modeling issue.

Design Fault

Numbers are represented by a finite number of digits in computer. Because of rounding errors, the numbers precision can be reduced during floating point operations. The reduced precision can lead to non-convergence for some special cases. Those special cases are often created by faulty design and need to be brought to the designer's attention.

A first design fault issue involves a near short-circuit case. There can be large rounding errors when calculating a sum of the currents flow in/out of the node so the residue criterion of equation (15) is violated.

A second design fault is the high-impedance node case. The ground impedance at a node is very large. The node is considered "floating" or isolated from other circuit nodes. The node voltage update between Newton cannot be computed accurately due to the rounding error causing the update criterion of equation (16) to be violated.

Solution to Issue of Nonconvergence Errors

There are two problems making debugging a transient non-convergence error extremely hard for existing circuit simulators. First of all, the transient simulation may run for days before it fails with non-convergence errors. It will also take another few days for a designer or an EDA engineer to reproduce the failure. Secondly, most modern simulators work hard to go around the non-convergence by trying a number of heuristics, such as reducing time step size, changing time integration method, reconditioning matrices, loosening tolerances, or even slightly altering the circuit itself. This rescue effort is often performed in a "kitchen sink" fashion without user's knowledge, creating obstacles that prevent the user from identifying the actual cause of the non-convergence.

Figure 7:
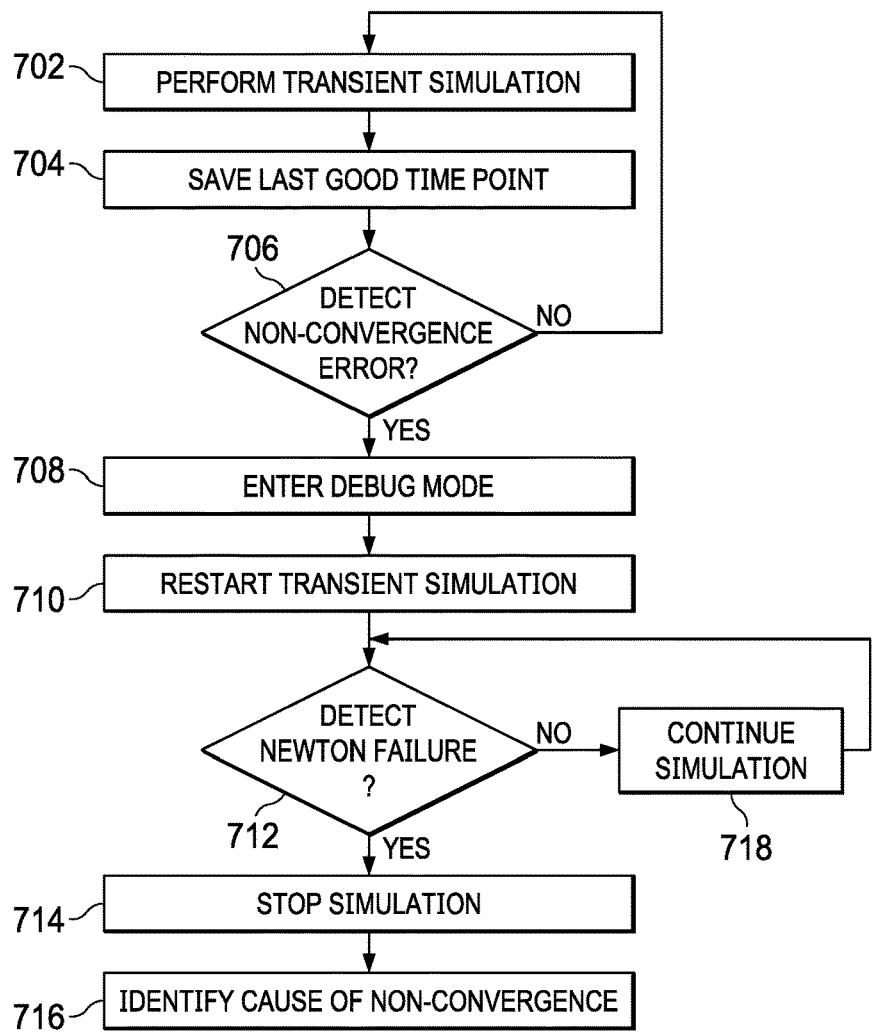
FIG. 7 illustrates a method for to overcome a problem during performance of a transient circuit simulation.

Referring now to FIG. 7, there is illustrated a method to overcome this first problem during performance of a transient circuit simulation at 702. The method keeps saving the "last good" time point during regular transient circuit simulation at 704. The last good time point is the most recently accepted time point at which Newton converges easily (with a small number of iterations) and with full accuracy. When a non-convergence error is detected at 706, the information saved allows the simulator to restart from the saved time point smoothly. Otherwise, the simulation continues to perform at 702. For example, if a backward Euler is used for time integration, only solution vectors at current and previous time points ($\bar{v}_m$, $\bar{v}_{m-1}$) need to be saved as well as the charge vector ($\bar{q}_m$) at the current time point as the last good time points. For a $2^{nd}$ Gear method, more solution and charge vectors at previous time points ($\bar{v}_{m-2}$, $\bar{q}_{m-1}$) need to be saved as the last good time points. In addition, circuit state variables and time step information need to be saved for smooth restart of the simulation. If there is a Verilog-A module in the circuit, the internal state of the Verilog-A model will be also saved so it can be restored properly during a restart. Furthermore, in the case of mixed-signal or AMS simulation, the states of the digital simulator and interface components need to be saved to ensure a successful restart as part of the last good time point. The last good time point is constantly updated at 704 as the circuit simulator advances in time.

If the transient circuit simulation fails due to non-convergence errors, the process automatically turns on debug mode at 708 and restarts the transient simulation from the saved last good time point at 710. Once the restarted transient simulation detects a Newton failure for the first time at 712. The simulation is stopped at 714 (no kitchen sink or work around) and starts to identify the cause of non-convergence at 716. If no Newton failure is detected at 712 the simulation is continued at 718 until a failure is detected or the simulation completes.

Figure 8:
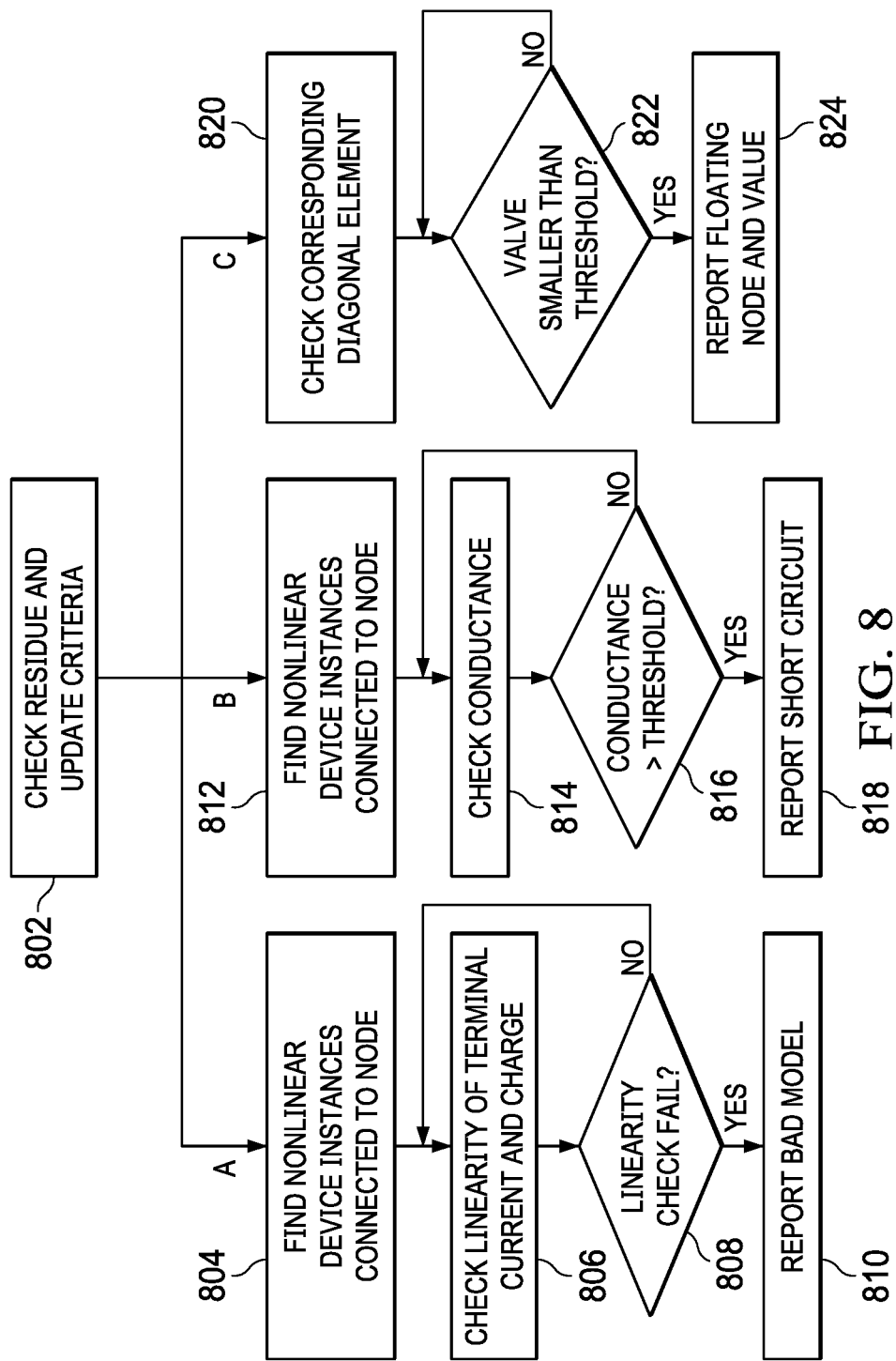
FIG. 8 illustrates a flow diagram of a method for detecting convergence errors within a circuit simulation.

Referring now to FIG. 8, the method will force a complete check at 802 of both residue and update criteria according to equations (15) and (16) for all the equations/nodes and then perform the following steps. First, for each node that fails to satisfy residue criterion (15) or update criterion (16) (branch A), find all the nonlinear device instances connected the node at 804. For each connected instance, check linearity of the terminal current and charge that contribute to the node at 806. One way to do this is to evaluate inequalities using equations (17) and (18) with user specified options $\epsilon_i$ and $\epsilon_q$. If the linearity check is failed at inquiry step 808, report the "bad model" case by outputting a "bad model" message with model name, instance name, terminal parameter (current or charge) and instance biases at 810.

For each node that fails to satisfy residue (KCL) criterion of equation (15) (branch B), all the nonlinear device instances connected the node are found at 812. For each connected instance, check each conductance connected to the node at 814. If any conductance is greater than the threshold specified by the user at inquiry step 816, report the "short circuit" case by outputting a "short circuit" message with model name, instance name, conductance name, conductance value and instance biases at 818.

For each node that fails to satisfy update criterion (16) (branch C), check the value of corresponding diagonal element of the conductance matrix, $\bar{G}$ in equation (14) at 820, which is the ground impedance of the node. If the value is smaller than the threshold specified by the user at inquiry step 822, report the "floating node" case by outputting a "floating node" message with node name, and the value of diagonal element at 824.

Figure 9:
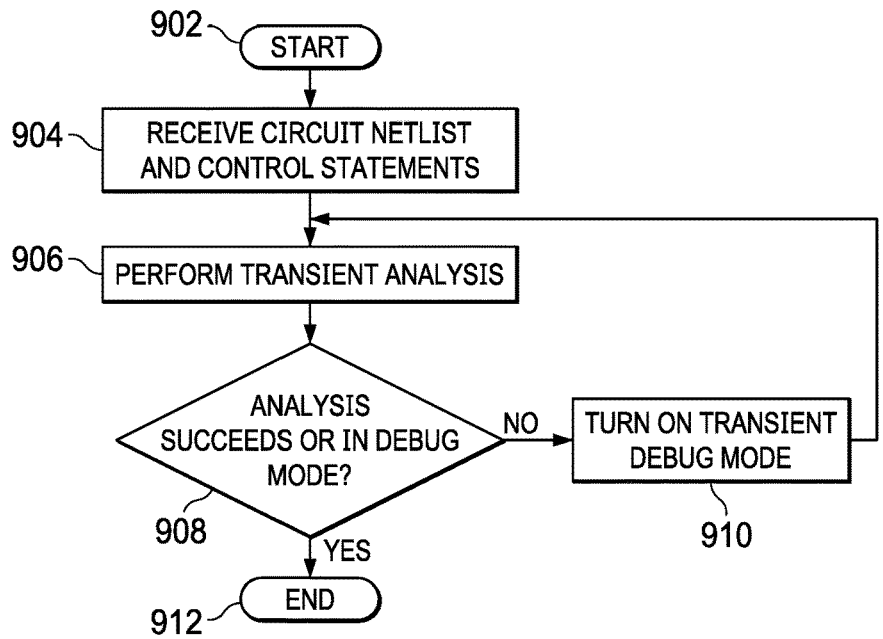
FIG. 9 illustrates a top-level flow diagram for transient circuit simulation with an automatic debug feature.

Referring now to FIGS. 9-12 there are more fully illustrated the flow charts for the process. The basic flows for circuit simulation can be found in FIGS. 3A-3E. Referring now to FIG. 9, there is illustrated a top-level flow diagram for transient circuit simulation with an automatic debug feature. The process is initiated at step 902, and a circuit netlist and control statements for a particular circuit design are received at step 904. The process performs transient analysis on the circuit design beginning at step 906. Inquiry step 908 determines whether the transient analysis was successful or there is a need to enter the circuit analysis into a debug mode. A successful analysis would not detect the occurrence of a non-convergence error as discussed above. If a convergence error is detected and the process enters the debug mode, the transient debug mode is turned on at step 910 to begin the transient debug mode analysis and returns to step 906 utilizing that last save points as discussed previously. If inquiry step 908 determines that the analysis was successful, the process ends at step 912.

Figure 10:
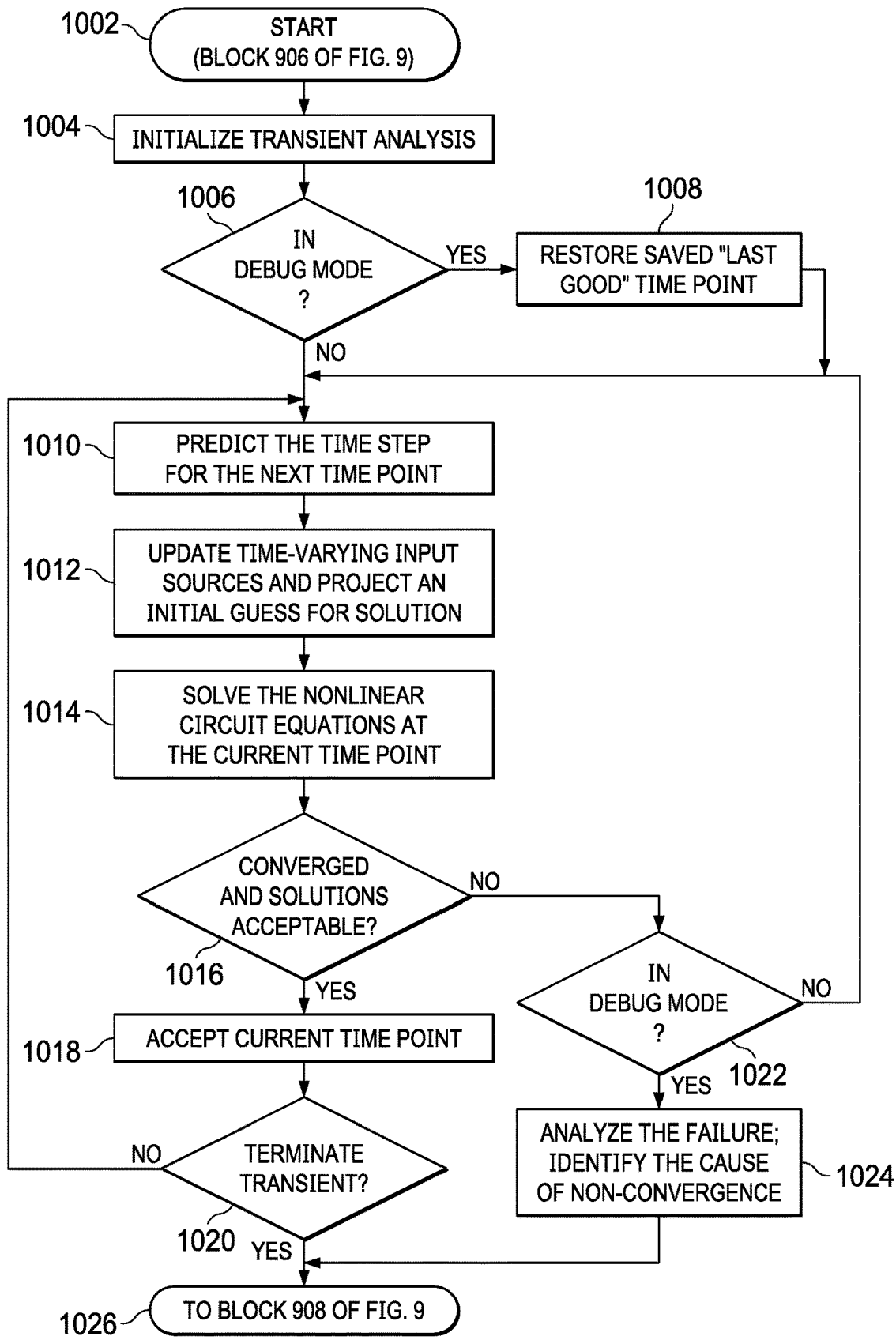
FIG. 10 illustrates an operation of a transient flow circuit analysis once a debug feature has been initiated.

Referring now to FIG. 10, there is illustrated the operation of the transient flow circuit analysis once the debug feature has been initiated. This process more particularly describes the operation of the perform transient analysis block 906 of FIG. 9. The process is initiated at block 1002. The transient analysis is initialized at step 1004. Inquiry step 1006 determines whether the process is within a debug mode. If the analysis is within a debug mode, control passes to block 1008 to restore a previously saved "last good" time point stored in the memory. If the analysis process is not within the debug mode as determined at step 1006 or once the "last save" time point has been restored at step 1008, the time step for a next time point is predicted at step 1010. Based upon the predicted time step, the time varying input sources are updated and an initial guess for the solution is projected at step 1012. Based upon the projections, the nonlinear circuit equations at the current time point are solved for at step 1014. Inquiry step 1016 determines if the solution converges and is acceptable. If so, the current time point is accepted and stored at step 1018, and inquiry step 1020 determines if the transient error has been terminated. If the transient error is not terminated control passes back to step 1010 to predict a time step for the next time point, and the process repeats. If the transient error is determined to be terminated at inquiry step 1020 control passes to block 1026 to return to block 908 of FIG. 9. If inquiry step 1016 determines that there is no convergence or acceptable solution, control passes to inquiry step 1022 to determine if the process is currently within the debug mode. If not within the debug mode, control passes back to step 1010 to predict a next step for a next time point. If inquiry step 1022 determines that the process is within a debug mode, the failure of convergence is analyzed in order to identify the cause of the non-convergence at step 1024. Control then passes on to step 1026.

Figure 11:
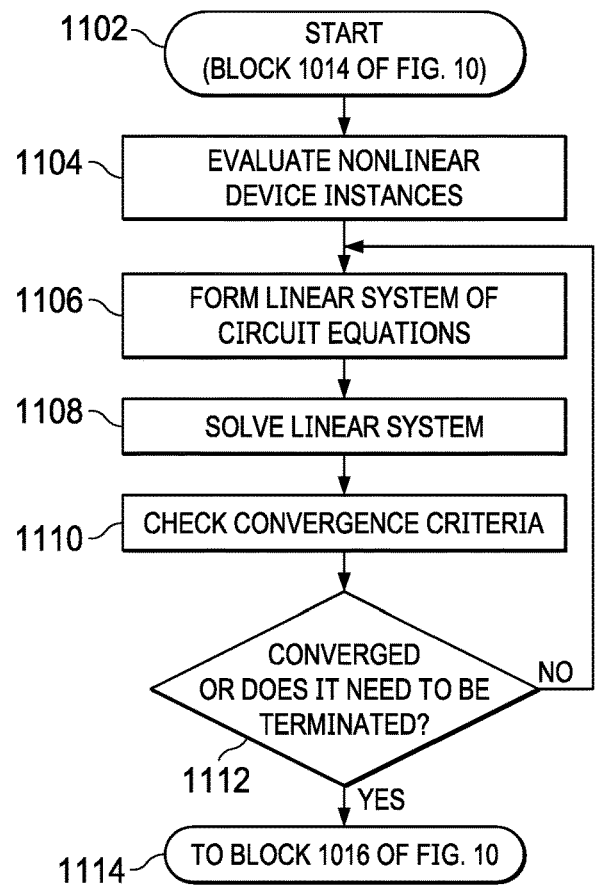
FIG. 11 illustrates a flow chart for using the Newton-Raphson Method to determine convergence within a simulation.

FIG. 11 illustrates the flow chart for using the Newton-Raphson Method to determine convergence. FIG. 11 more particularly illustrates the process occurring within block 1014 of FIG. 10 with respect to solving of the nonlinear circuit equations at a current time point to detect convergence. The process is initiated at step 1102. The nonlinear device instances are evaluated at step 1104 as discussed above. A linear system of circuit equations are formed at step 1106. The linear system of circuit equations are solved at step 1108. The convergence criteria for the linear system is checked at step 1110. Inquiry step 1112 determines whether the system has converged or whether the analysis process needs to be terminated. If the system has neither converged nor needs to be terminated control passes back to step 1104. If the system converges or needs to be terminated control passes to block 1114 which returns operation to block 1016 of FIG. 10.

Figure 12:
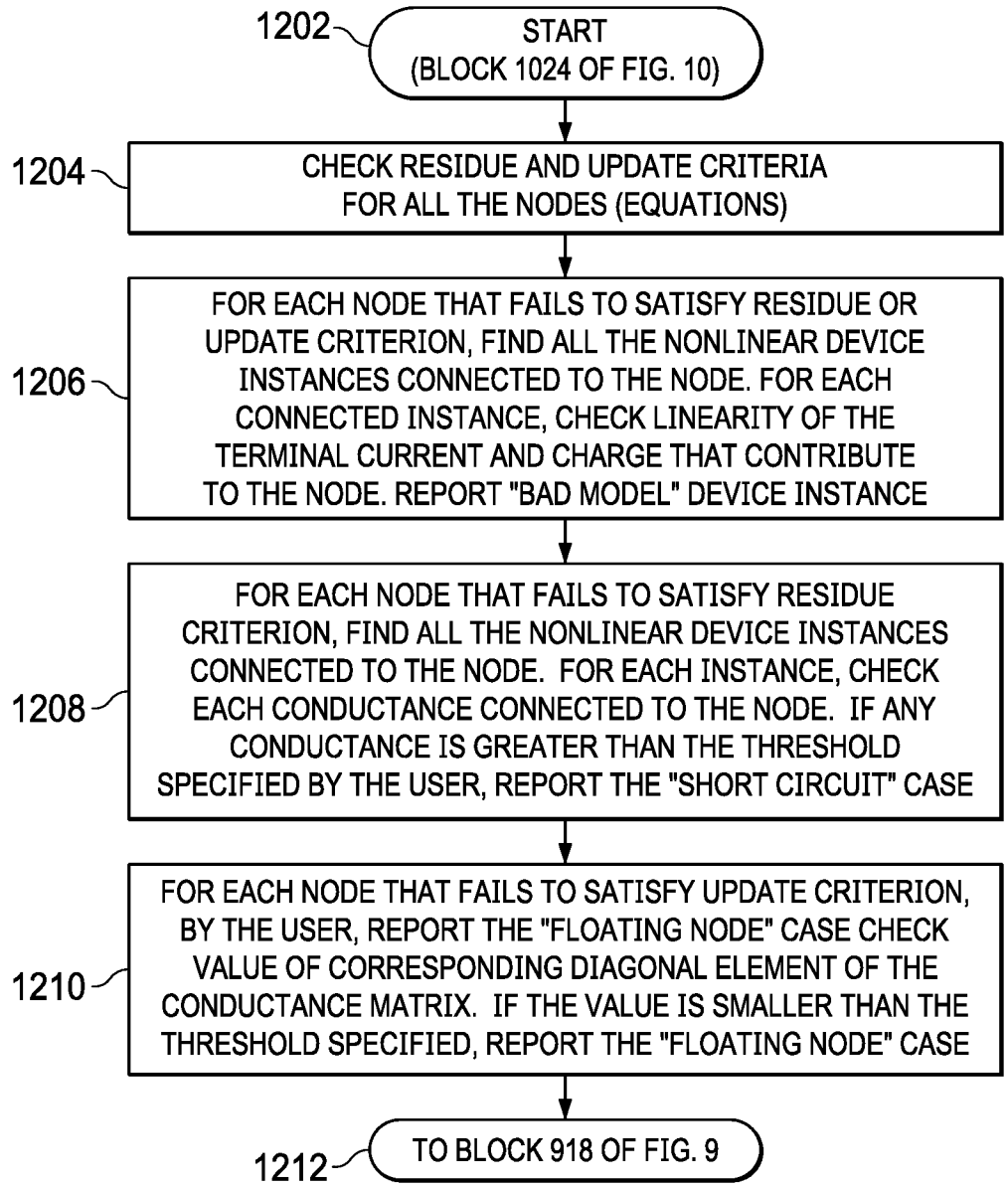
FIG. 12 illustrates a flowchart for a failure analysis process.

Referring now to FIG. 12, there is illustrated a flowchart for the failure analysis process occurring in block 1024 of FIG. 10. The process is initiated at step 1202 and the residue and update criteria for all of the nodes are checked at step 1004 using the residue and update equations described with respect to equations (15) and (16) hereinabove. For each node that fails to satisfy the residue or update criteria, all of the nonlinear device instances connected to the node are found at step 1206. For each connected instance, the linearity of the terminal current and charge that contribute to the node are connected. Failure of this analysis enables the report of a bad model device instance. For each node that fails to satisfy the residue criteria, all of the nonlinear device instances connected to the node are located at step 1208. For each nonlinear instance the conductance connected to the node are checked, and if any conductance is greater than a threshold specified by the user, a report of a short circuit case is provided. Finally, for each node that fails to satisfy the update criteria a report of the "floating node" case check value of a corresponding diagonal element of the conductance matrix is made. If the value is smaller than a threshold specified, a floating node case is reported. Control then returns back to block 908 of FIG. 9 at 1212.

This process describes the manner for determining the causes of non-convergence errors that may occur within circuit simulations. By providing a particular manner for locating a point causing non-convergence errors within a circuit simulation, better and more complete analysis of circuit simulations may be provided.

It will be appreciated by those skilled in the art having the benefit of this disclosure that this system and method for identifying design faults or semiconductor modeling errors by analyzing failed transient simulation of an integrated circuit provides a improve manner for detecting and correcting non-convergence errors within circuit simulations. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for detecting non-convergence error in a transient circuit simulation, comprises:
   a) receiving a circuit netlist describing component model connections for a circuit and control statements defining device parameter tolerances associated with the circuit for use in the transient circuit simulation for the circuit at a circuit simulator;
   b) performing the transient circuit simulation for the circuit responsive to a selected time point, the circuit netlist and the control statements at the circuit simulator;
   c) determining whether a non-convergence error has occurred during the transient circuit simulation for the circuit;
   d) actuating a transient debug mode within the circuit simulator responsive to determination of occurrence of the non-convergence error by the circuit simulator;
   e) repeating steps b)-c) after actuation of the transient debug mode within the circuit simulator, wherein the selected time point comprises a saved last good time point stored responsive to a successful convergence from performance of a previous transient circuit simulation for the circuit by the circuit simulator;

f) identifying at least one bad model device instance within the circuit netlist that is causing the non-convergence error responsive to execution of the transient debug mode from the saved last good time point by the circuit simulator;

g) identifying a particular fault causing the non-convergence error responsive to execution of the transient debug mode from the saved last good time point by the circuit simulator;

h) identifying a particular node where the non-convergence error occurs responsive to execution of the transient debug mode from the saved last good time point by the circuit simulator; and i) correcting a base parametric device model for the circuit to provide a modified device model for the circuit that allows simulation computations to converge, wherein the step of correcting further comprises:
(j) acquiring a corrected device model that is linear when the base parametric device model is operating out of range;
(k) determining a boundary of a normal operating range of the corrected device model;
(l) selecting a first order linear polynomial or a second order linear polynomial for updating the corrected device model responsive to the determined boundary;
(m) computing parameters for the corrected device model responsive to the first order linear polynomial or the second order linear polynomial 1; and
(n) generating the modified device model responsive to the corrected device model and the computed parameters.

2. The method of claim 1, wherein the step of performing further comprises:
a) determining whether the transient debug mode has been actuated at the circuit simulator;
b) performing the transient circuit simulation responsive to the selected time point associated with the received circuit netlist and control statements if the transient debug mode has not been actuated at the circuit simulator;
c) performing the transient circuit simulation responsive to the saved last good time point when the transient debug mode has been actuated at the circuit simulator using the transient debug mode;
d) determining whether a convergence or a non-convergence has occurred responsive to the transient circuit simulation at the circuit simulator;
e) saving a new saved last good time point if the convergence has occurred in a memory; and
f) repeating steps c)-e) until the non-convergence occurs at the circuit simulator.

3. The method of claim 2, wherein the step of performing the transient circuit simulation responsive to the saved last good time point further comprises:
predicting a time step for a next time point responsive to the saved last good time point at the circuit simulator using the transient debug mode; and
solving nonlinear circuit equations for the next time point responsive to the circuit netlist describing the component model connections and the control statements defining the device parameter tolerances at the circuit simulator using the transient debug mode.

4. The method of claim 3, wherein the step of solving further comprises:
determining nonlinear device instances in the circuit at the circuit simulator using the transient debug mode;
forming a linear system of equations based on the determined nonlinear device instances responsive to the circuit netlist describing the component model connections and the control statements defining the device parameter tolerances at the circuit simulator using the transient debug mode; and
solving the linear system of equations to indicate if the convergence or the non-convergence has occurred at the circuit simulator using the transient debug mode.

5. The method of claim 2, wherein the step of identifying further comprises:
determining a residue criteria and an update criteria for each node in the circuit as defined by the circuit netlist describing the component model connections at the circuit simulator using the transient debug mode;
determining if the residue criteria and the update criteria are satisfied for each node in the circuit as defined by the circuit netlist describing the component model connections at the circuit simulator using the transient debug mode; and
establishing a type of the non-convergence error responsive to the determination of whether the residue criteria and the update criteria are satisfied for each node in the circuit as defined by the circuit netlist describing the component model connections at the circuit simulator using the transient debug mode.

6. The method of claim 5, wherein the step of establishing further comprises:
performing a linearity check of devices connected to each node as defined by the circuit netlist describing the component model connections that fails to satisfy the residue criteria and the update criteria at the circuit simulator using the transient debug mode; and
reporting a bad model device instance for each device that fails the linearity check at the circuit simulator using the transient debug mode.

7. The method of claim 5, wherein the step of establishing further comprises:
determining a conductance for each non-linear device instance connected to each node of the circuit as defined by the circuit netlist describing the component model connections that fails to satisfy the residue criteria at the circuit simulator using the transient debug mode; and
reporting a short circuit case if any determined conductance exceeds a predetermined threshold at the circuit simulator using the transient debug mode.

8. The method of claim 5, wherein the step of establishing further comprises:
determining a floating node case check value of a corresponding diagonal element for a conductance matrix for each node of the circuit as defined by the circuit netlist describing the component model connections that fails to satisfy the update criteria at the circuit simulator using the transient debug mode; and
reporting a floating node case if any determined floating node case check value is smaller than a predetermined threshold at the circuit simulator using the transient debug mode.

9. The method of claim 1 further comprising correcting the identified causes of the non-convergence error within the circuit netlist responsive to the identified at least one bad model device instance within the circuit netlist, the identified particular fault and the identified particular node.

10. A system for detecting non-convergence error in a transient circuit simulation, comprises:
a circuit simulator configured to run the transient circuit simulation on a circuit;
a memory for storing a last good time point of the transient circuit simulation;
a non-convergence detector having a transient debug mode therein implemented within the circuit simulator configured to detect the non-convergence error during the transient circuit simulation, wherein the non-convergence detector is further configured to:
a) receive a circuit netlist describing a component model connections for the circuit and control statements defining device parameter tolerances associated with the circuit for use in the transient circuit simulation for the circuit at the circuit simulator;
b) perform the transient circuit simulation for the circuit responsive to a selected time point, the circuit netlist and the control statements at the circuit simulator;
c) determine whether a non-convergence error has occurred during the transient circuit simulation for the circuit;
d) actuate the transient debug mode within the circuit simulator responsive to determination of occurrence of the non-convergence error by the circuit simulator;
e) repeat steps b)-c) after actuation of the transient debug mode within the circuit simulator, wherein the selected time point comprises a saved last good time point stored responsive to a successful convergence from performance of a previous transient circuit simulation for the circuit by the circuit simulator;
f) identify at least one bad model device instance within the circuit netlist that is causing the non-convergence error responsive to execution of the transient debug mode from the saved last good time point by the circuit simulator, wherein the non-convergence detector is further configured to:
g) identify a particular fault causing the non-convergence error responsive to execution of the transient debug mode from the saved last good time point by the circuit simulator;
h) identify a particular node where the non-convergence error occurs responsive to execution of the transient debug mode from the saved last good time point by the circuit simulator; and
i) correct a base parametric device model for the circuit to provide a modified device model for the circuit that allows simulation computations to converge, wherein the step of correcting further comprises:
(j) acquire a corrected device model that is linear when the base parametric device model is operating out of range;
(k) determine a boundary of a normal operating range of the corrected device model;
(l) select a first order linear polynomial or a second order linear polynomial for updating the corrected device model responsive to the determined boundary;
(m) compute parameters for the corrected device model responsive to the first order linear polynomial or the second order linear polynomial 1; and (n) generate the modified device model responsive to the corrected device model and the computed parameters.

11. The system of claim 10, wherein the non-convergence detector when performing the transient circuit simulation is further configured to:
a) determine whether the transient debug mode has been actuated at the circuit simulator;
b) perform the transient circuit simulation responsive to the selected time point associated with the received circuit netlist and control statements if the transient debug mode has not been actuated at the circuit simulator;
c) perform the transient circuit simulation responsive to the saved last good time point when the transient debug mode has been actuated at the circuit simulator using the transient debug mode;
d) determine whether a convergence or a non-convergence has occurred responsive to the transient circuit simulation at the circuit simulator; and
e) save a new saved last good time point if the convergence has occurred in the memory; and
f) repeat steps c)-e) until the non-convergence occurs at the circuit simulator.

12. The system of claim 11, wherein the non-convergence detector when performing the transient circuit simulation responsive to the saved last good time point is further configured to:
predict a time step for a next time point responsive to the saved last good time point at the circuit simulator using the transient debug mode; and
solve nonlinear circuit equations for the next time point responsive to the circuit netlist describing the component model connections and the control statements defining the device parameter tolerances at the circuit simulator using the transient debug mode.

13. The system of claim 12, wherein the non-convergence detector when solving the nonlinear circuit equations is further configured to:
determine nonlinear device instances in the circuit at the circuit simulator using the transient debug mode;
form a linear system of equations based on the determined nonlinear device instances responsive to the circuit netlist describing the component model connections and the control statements defining the device parameter tolerances at the circuit simulator using the transient debug mode; and
solve the linear system of equations to indicate if the convergence or the non-convergence has occurred at the circuit simulator using the transient debug mode.

14. The system of claim 11, wherein the non-convergence detector when identifying the at least one bad model device instance within the circuit netlist that is causing the non-convergence error is further configured to:
determine a residue criteria and an update criteria for each node in the circuit as defined by the circuit netlist describing the component model connections at the circuit simulator using the transient debug mode;
determine if the residue criteria and the update criteria are satisfied for each node in the circuit as defined by the circuit netlist describing the component model connections at the circuit simulator using the transient debug mode; and
establish a type of the non-convergence error responsive to the determination of whether the residue criteria and the update criteria are satisfied for each node in the circuit as defined by the circuit netlist describing the component model connections at the circuit simulator using the transient debug mode.

15. The system of claim 14, wherein the non-convergence detector when establishing the type of the non-convergence error is further configured to:
   perform a linearity check of devices connected to each node as defined by the circuit netlist describing the component model connections that fails to satisfy the residue criteria and the update criteria at the circuit simulator using the transient debug mode; and
   report a bad model device instance for each device that fails the linearity check at the circuit simulator using the transient debug mode.

16. The system of claim 14, wherein the non-convergence detector when establishing the type of the non-convergence error is further configured to:
   determine a conductance for each non-linear device instance connected to each node of the circuit as defined by the circuit netlist describing the component model connections that fails to satisfy the residue criteria at the circuit simulator using the transient debug mode; and
   report a short circuit case if any determined conductance exceeds a predetermined threshold at the circuit simulator using the transient debug mode.

17. The system of claim 14, wherein the non-convergence detector when establishing the type of the non-convergence error is further configured to:
   determine a floating node case check value of a corresponding diagonal element for a conductance matrix for each node of the circuit as defined by the circuit netlist describing the component model connections that fails to satisfy the update criteria at the circuit simulator using the transient debug mode; and
   report a floating node case if any determined floating node case check value is smaller than a predetermined threshold at the circuit simulator using the transient debug mode.

18. A method for detecting non-convergence error in a transient circuit simulation, comprises:
   receiving a circuit netlist describing component model connections for a circuit and control statements defining device parameter tolerances associated with the circuit for use in the transient circuit simulation for the circuit at a circuit simulator;
   performing the transient circuit simulation for the circuit responsive to a selected time point, the circuit netlist and the control statements at the circuit simulator;
   determining whether a non-convergence error has occurred during the transient circuit simulation for the circuit;
   actuating a transient debug mode within the circuit simulator responsive to determination of occurrence of the non-convergence error by the circuit simulator;
   performing a second transient circuit simulation for the circuit using the circuit simulator in the transient debug mode responsive to a saved last good time point stored responsive to a successful convergence from performance of a previous transient circuit simulation for the circuit, the circuit netlist and the control statements;
   determining whether the non-convergence error is caused by one of a bad model, high impedance and a short circuit responsive to execution of the circuit simulator in the transient debug mode responsive to the saved last good time point;
   determining a node causing the non-convergence error responsive to execution of the circuit simulator in the transient debug mode responsive to the saved last good time point; and
   correcting a base parametric device model for the circuit to provide a modified device model for the circuit that allows simulation computations to converge.

19. The method of claim 1, wherein the step of determining a cause of the non-convergence error further comprises:
   recording data associated with execution of the transient circuit simulation during execution of the transient debug mode at the circuit simulator using the transient debug mode;
   detecting a first occurrence of the non-convergence error during execution of the transient debug mode at the circuit simulator using the transient debug mode; and
   determining the cause of the non-convergence error from the recorded data at the circuit simulator using the transient debug mode.

20. The system of claim 10, wherein the non-convergence detector when performing the transient circuit simulation is further configured to:
   record data associated with execution of a second transient circuit simulation during execution of the transient debug mode at the circuit simulator using the transient debug mode;
   detect a first occurrence of the non-convergence error during execution of the transient debug mode at the circuit simulator using the transient debug mode; and
   determine a cause of the non-convergence error from the recorded data at the circuit simulator using the transient debug mode.

\* \* \* \* \*